Jan. 8, 1963     P. MOULIN     3,071,930
HYDRAULIC DIFFERENTIAL FORCE TRANSMISSION MEANS
Filed July 26, 1961     2 Sheets-Sheet 1

INVENTOR.
PIERRE MOULIN
BY
*A. A. Steinmiller*
ATTORNEY

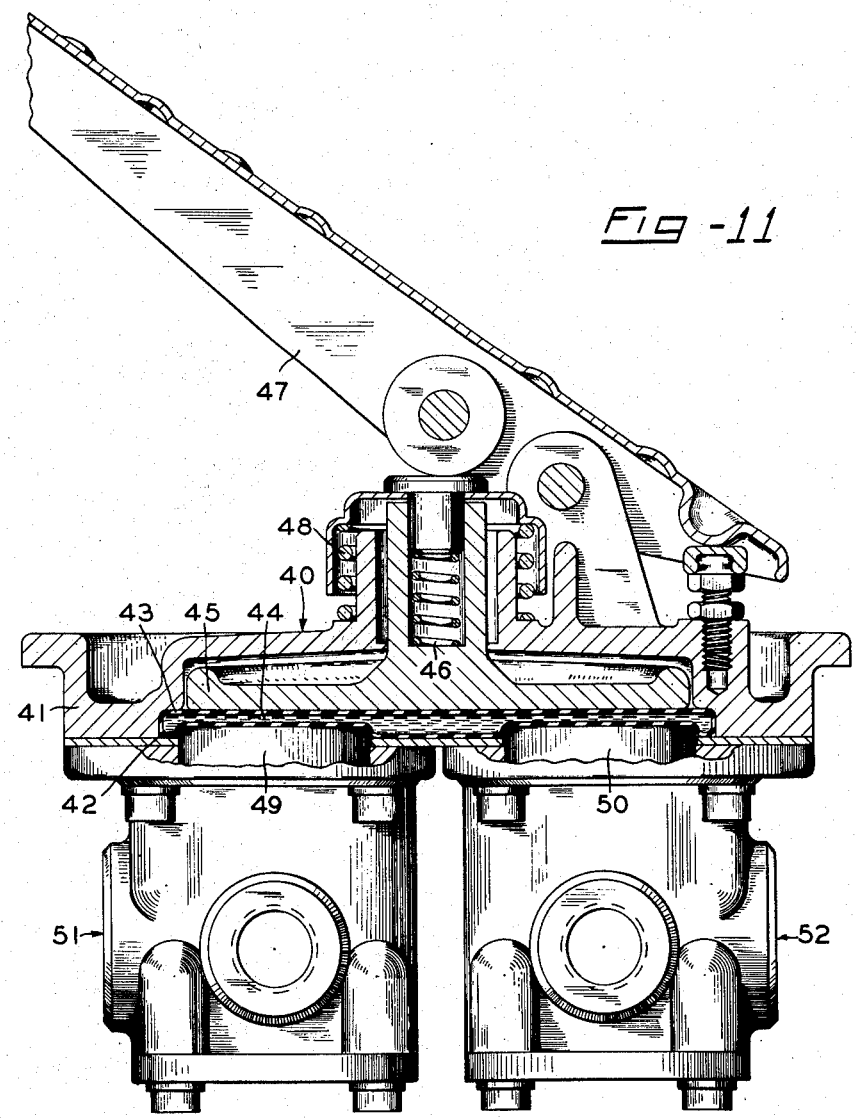

ated Jan. 8, 1963

United States Patent Office 3,071,930
Patented Jan. 8, 1963

3,071,930
HYDRAULIC DIFFERENTIAL FORCE
TRANSMISSION MEANS
Pierre Moulin, Saint-Mande, France, assignor to Compagnie des Freins et Signaux Westinghouse, Paris, France
Filed July 26, 1961, Ser. No. 126,944
Claims priority, application France Aug. 6, 1960
4 Claims. (Cl. 60—54.5)

This invention relates to hydraulic differential force transmission means and, more particularly, to such means comprising a flexible sealed envelope containing a liquid via which a force is transmitted, said liquid-filled envelope being located in a chamber between a force-delivering member and a force-receiving member, both members bearing directly on said envelope.

The use of hydraulic means for transmission of working forces is highly advantageous in that it: (1) provides instantaneous transmission of the force to remote points; (2) readily attains equalization of the forces; (3) adapts itself to maintaining a constant relationship of the forces; (4) not being mechanical, eliminates friction problems; and (5) is capable of providing forces of great magnitude. The use of hydraulic means, however, when used under certain conditions also presents certain disadvantages, such as: (1) difficulty in providing perfectly tight seals; (2) the necessity of using a liquid of low expansion coefficient in order that expansion due to thermal changes is held to a minimum; and (3) the necessity of drain cocks in the system for removing undesired air or other gases that may get into the system.

The object of the present invention, therefore, is to provide a hydraulic system or means for transmitting differential forces by the use of a non-compressible fluid without the disadvantages above listed. The invention is essentially characterized by the use of a liquid for transmitting a force or forces, said liquid being contained in a flexible envelope located in a chamber cooperatively formed by extensions of casing bores in which respective force-transmitting pistons or followers, which bear directly against said envelope, are operable. This means of transmitting forces enhances the advantages above listed because it does not require the use of pressure re-taining relay devices between the source of pressurized fluid where the transmitted force is initiated and the point of expendability or use of the force, but does provide a means for transmitting the force directly from the source to the point of expendability at an advantage ratio of one to one or better.

Figure 1:
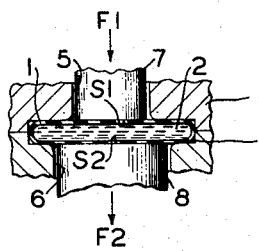
Figure 2:
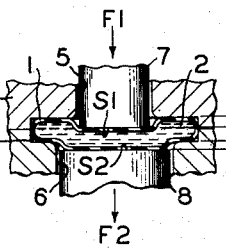
Figure 8:
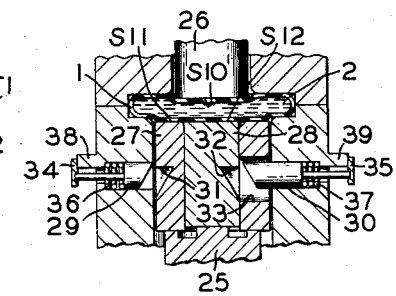
Figure 3:
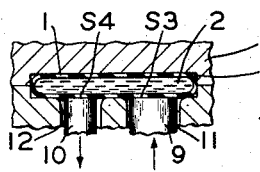
Figure 4:
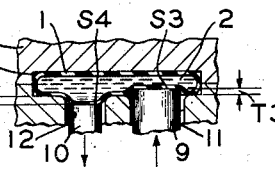
Figure 9:
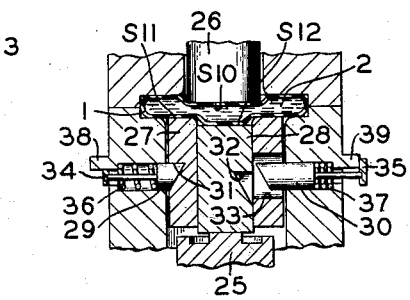
Figures 5, 6:
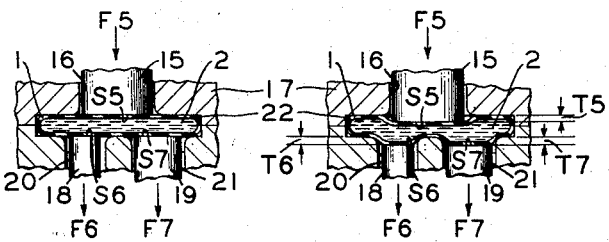
Figure 10:
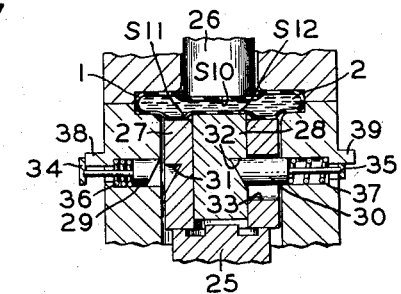
Figure 7:
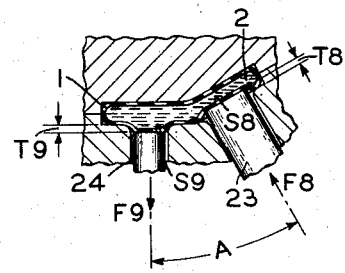

In the drawings, FIGS. 1 and 2 schematically represent one form of the invention in which the forces are transmitted in a common direction; FIGS. 3 and 4 schematically represent another form of the invention whereby the forces are transmitted in parallel, but non-common direction; FIGS. 5 and 6 schematically represent another form of the invention illustrating how the transmitted force may be converted to several component forces transmitted in respective non-common directions; FIG. 7 schematically shows the manner in which the directions of the transmitted forces may be arranged in an angular relationship; FIGS. 8, 9 and 10 show yet another embodiment of the invention whereby the transmission of the forces may be controlled at will according to various fixed relationships; and FIG. 11 finally shows a manually operable valve device, partly in section and partly in outline, in which the principles of the invention are applied.

Description and Operation

The invention, as represented in FIGS. 1 and 2, comprises a flexible container or envelope 1 of plastic material, such as rubber or any other suitable material, in which a liquid 2, by which a force may be transmitted, is sealed. The liquid-filled envelope 1 is disposed in a chamber 3 formed in a casing 4, said chamber being of substantially similar volume as that of said envelope and the liquid 2 to thereby provide a rigid limiting wall for the forces supported by said liquid-filled envelope. A pair of axially aligned bores 5 and 6 extend in opposite relation from the chamber 3, said bores having respectively and operably disposed therein a control piston 7 and a follower piston 8 bearing directly on respective opposite sides of the liquid-filled envelope 1.

In considering the operation of the invention, particularly the embodiment shown in FIGS. 1 and 2, it will be noted that FIG. 1 shows the respective positions of the several components prior to the kinetic effect of a force F1 (represented in the drawing by an arrow), applied to the control piston 7, in the direction indicated, while FIG. 2 shows the positions of the several components after displacement resulting from the kinetic effect of force F1 on control piston 7. Force F1 is transmitted from the control piston 7 to the follower piston 8 through the liquid 2 in envelope 1, whereby it is translated into a force F2, which is also represented in the drawing by an arrow and which is transmitted by the follower (in a manner not shown) to a device or mechanism for operating the same. If the respective areas of the surfaces of control piston 7 and follower piston 8 bearing against the envelope 1, are designated S1 and S2, the force F2 is equal to F1 times $$\frac{S2}{S1}$$

Furthermore, the travel of follower piston 8, designated as T2 in the drawing, is equal to the travel of control piston 7, designated as T1 in the drawing, times $$\frac{S1}{S2}$$

FIGS. 3 and 4 illustrate a different arrangement of a control piston 9 with a follower piston 10 in respective bores 11 and 12 formed in a casing 13 having a chamber 14 in which envelope 1 is disposed, said pistons being arranged with their respective axes in a parallel relationship rather than an axially aligned relationship as in FIGS. 1 and 2. The operation of the embodiment shown in FIGS. 3 and 4 is similar in principle to that of the embodiment shown in FIGS. 1 and 2. If F3 is the force applied to control piston 9, then F4, the force transmitted by follower piston 10, is equal to F3 times $$\frac{S4}{S3}$$

where S3 and S4 represent the respective areas of the surfaces of said control piston and said follower piston bearing against the envelope 1. The travel of follower piston 10, designated as T4 in the drawing, is equal to the travel of control piston 9, designated T3 in the drawing, times $$\frac{S3}{S4}$$

In the embodiment shown in FIGS. 5 and 6, a single control piston 15, operable in a bore 16 formed in a casing 17, is disposed with its axis parallel to a pair of follower pistons 18 and 19 operable in respective bores 20 and 21, said follower pistons having their axes in parallel relation to each other and to the axis of said control piston. The liquid-filled envelope 1 is disposed in a chamber 22 formed in casing 17. This arrangement enables the transmission of forces to a plurality of respective apparatuses operated by the follower pistons 18 and 19 through the single control piston 15.

If the effective area of control piston 15 is designated as S5, the effective areas of follower pistons 18 and 19 are designated as S6 and S7, respectively, the control force applied to control piston 15 as F5, and the forces transmitted by the follower pistons 18 and 19 as F6 and F7, respectively, it will be seen that F6 equals F5 times $$\frac{S6}{S5}$$

and that F7 equals F5 times $$\frac{S7}{S5}$$

Furthermore, if the respective travels of pistons 15, 18 and 19 are designated as T5, T6 and T7, respectively, then T5 times S5 equals T6 times S6 plus T7 times S7. Of course, if areas S6 and S7 are equal, the forces F6 and F7 transmitted by the follower pistons 18 and 19, respectively, will also be equal.

FIG. 7 shows how a control piston 23 and a follower piston 24 may be disposed at some angle A for purposes of convenience. Since the principle of operation is similar to that of the embodiments shown in FIGS. 1 through 4, the relationship of forces F8 and F9, acting on the pistons 23 and 24, and the amount of travel T8 and T9, as related to effective areas S8 and S9, respectively, of said pistons may be determined in a manner similar to that above set forth in connection with said embodiments shown in FIGS. 1 through 4.

FIGS. 8, 9 and 10 illustrate a further application of the invention whereby it is possible to obtain various degrees of translated forces transmitted by a follower piston 25 while a force applied to a control piston 26 remains constant. This end is accomplished by providing two intermediate follower pistons 27 and 28, one of which may be called the inner intermediate piston and is coaxially operable within a coaxially extending bore formed within the other, which may be called the outer intermediate piston, said pistons being capable of axial movement relative to each other and each having one end surface in contact with the envelope 1 and the opposite end surface abuttable with the follower piston 25. Relative movement of the intermediate follower pistons 27 and 28, for controlling the degree of force transmitted to the follower piston 25, is controlled by two latches 29 and 30 engageable in notches 31 and 32 formed in the intermediate pistons 27 and 28, respectively. Latch 30, when engaged in notch 32, extends through an oversize opening 33 formed in the wall of the outer intermediate piston 38.

For example, as shown in FIG. 8, both latches 29 and 30 are held in a disengaged position from notches 31 and 32 by stops 34 and 35 associated with the latches and biased by springs 36 and 37 against stop shoulders 38 and 39 conveniently formed on the casing. The opening 33 is large enough to permit sufficient freedom of movement of the outer intermediate piston 27 along with the inner intermediate piston 28 when a force is applied to control piston 26 and transmitted through the liquid-filled envelope 1, notwithstanding partial extension of latch 30 into said opening as shown in FIG. 8. Under these conditions both intermediate pistons 27 and 28 transmit a combined force to the follower piston 25 in accordance with an effective area S10 of the control piston 26 as related to an effective area comprising combined effective areas S11 and S12 of the intermediate pistons 27 and 28, respectively, as above explained in connection with the other embodiments of the invention.

FIG. 9 and FIG. 10 show the latches 29 and 30 engaged in the notches 31 and 32, respectively, whereby, in case of the condition as shown in FIG. 9, the force transmitted is in accordance with the effective area S12 of the inner piston 28 as related to S10, while, in case of the condition as shown in FIG. 10, the force transmitted is in accordance with the effective area S11 of the outer piston 27 as related to S10.

It should be apparent from the above description of the embodiment of the invention as shown in FIGS. 8, 9 and 10, that it is possible, with the use of the single control piston 26 in a single mechanism, to vary the force transmitted to the follower piston 25 while the force applied to the control piston 26 is maintained at a constant value.

FIG. 11 illustrates a practical application of the invention to a multiple control brake valve device 40.

The brake valve device 40 comprises a casing 41 having a chamber 42 in which a flexible envelope 43 containing a suitable liquid 44 is disposed, said chamber being substantially the volume of said envelope and the liquid therein. A pressure control piston 45 bears directly on the envelope 43, said control piston being constantly biased to bear on said envelope by a relatively light stabilizing spring 46 which acts to absorb any variations in volume of the liquid 44 due to temperature change for example. A pedal 48, acting against the biasing action of a heavier spring 48, is provided for applying a desired force on the control piston 45, which force transmitted, through the liquid-filled envelope 43, to a pair of follower pistons 49 and 50 each having one end bearing directly on said envelope in opposing relation to said control piston. The other respective ends of follower pistons 49 and 50 are operatively engaged (in a manner not shown) with respective self-lapping valve units 51 and 52 for operating the latter.

Of significance is the fact that, in the event of rupturing of the envelope 43, the brake control valve device 40 still remains operative since the control piston 45 may bear directly on the follower pistons 49 and 50. To repair such damage, it is merely necessary to replace the liquid-filled envelope 43.

Having now described the invention, what I claim as new and desire to secure by Letters Patent, is:

1. Force transmitting means for interposition between a force-applying member and a mechanism actuable by a force transmitted from the force-applying member, said force transmitting means comprising a casing, a control member operable in said casing in response to a force applied thereto, a first follower member operable in said casing in response to a force transmitted thereto from said control member, a second follower member operable in said casing in response to a force transmitted thereto from said control member, a flowable self-contained incompressible member operatively interposed between said control member and said first and second follower members in contacting relation therewith in a chamber formed in said casing, said chamber being of substantially similar volume as said flowable member via which an applied force acting on said control member may be transmitted to said first and second follower members, and latch means whereby said first and second follower members may be alternatively locked, at will, in an inoperative position to permit operation of one or the other of said first and second follower members or both may be unlocked to permit simultaneous operation thereof responsively to a force transmitted thereto from said control member, the value of the force acting on said first or second follower member or both being variable according to the disposition of said latch means.

2. Force transmitting means for interposition between a force-applying member and a mechanism actuable by a force transmitted from the force-applying member, said force transmitting means comprising a casing, a control member operable in said casing in response to a force applied thereto, a first follower member operable in said casing in response to a force transmitted thereto from said control member, a second follower member operable in said casing in response to a force transmitted thereto from said control member, a flowable self-contained incompressible member operatively interposed between said control member and said first and second follower members in contacting relation therewith in a chamber formed in said casing, said chamber being of substantially similar volume as said flowable member via which an applied force acting on said control member may be transmitted to said first and second follower members, and means for selectively locking, at will, said first or said second follower members against movement by force from said control member, whereby to permit a movement of said followers either singly or simultaneously.

3. Force transmitting means as defined in claim 2 wherein said first follower member comprises a solid cylindrical piston having one end in contact with said self-contained incompressible member and said second follower member comprises a sleeve-like cylindrical piston having one end in contact with said self-contained incompressible member and having a coaxial bore in which said solid piston is axially operable either with or relatively to said sleeve-like piston.

4. Force transmitting means as defined in claim 3 wherein said means for selectively locking said first and second followers comprises a first latch member operably extending through said casing, said first latch member having an unlatched position in which it is disengaged from a notch formed in said sleeve-like piston for permitting movement thereof and being operable to a latched position in which said notch in said sleeve-like piston is engaged thereby for restraining said sleevel-like piston against movement, and a second latch member operably extending through said casing and through a radially disposed bore in said sleeve-like piston, said second latch member having an unlatched position in which it is disengaged from a notch formed in said solid piston for permitting movement thereof and being operable to a latched position in which said notch in said solid piston is engaged thereby for restraining said solid piston against movement, said bore in said sleeve-like piston being of such diametral dimension as to permit unrestrained movement of said sleeve-like piston when said first latch member is in its said unlatched position, both said latch members being operable independently of each other for effecting combined or respective individual movement of said pistons.

References Cited in the file of this patent

UNITED STATES PATENTS

| 1,795,299 | Eddy | Mar. 10, 1931 |
| 2,623,361 | Dungler | Dec. 30, 1952 |